(12) United States Patent
He et al.

(10) Patent No.: US 6,942,924 B2
(45) Date of Patent: Sep. 13, 2005

(54) RADIATION-CURABLE ANTI-REFLECTIVE COATING SYSTEM

(75) Inventors: Liu He, Pleasanton, CA (US); Sung-Soon Park, LA, CA (US); Haixing Zheng, Oak Park, CA (US); Grace Tang, Sylmar, CA (US); Aylin Vance, Reseda, CA (US)

(73) Assignee: Chemat Technology, Inc., Northridge, CA (US)

( * ) Notice: Subject to any disclaimer, the term of this patent is extended or adjusted under 35 U.S.C. 154(b) by 0 days.

(21) Appl. No.: 10/001,639

(22) Filed: Oct. 31, 2001

(65) Prior Publication Data

US 2003/0082399 A1 May 1, 2003

(51) Int. Cl.$^7$ .................................. B32B 9/00
(52) U.S. Cl. .................. 428/429; 428/432; 428/441; 428/446; 428/448; 428/412
(58) Field of Search .................. 428/429, 432, 428/441, 446, 448, 412; 359/580, 582, 586

(56) References Cited

U.S. PATENT DOCUMENTS

| | | |
|---|---|---|
| 2,553,314 A | 5/1951 | Haber |
| 3,012,006 A | 12/1961 | Holbrook et al. |
| 3,244,541 A | 4/1966 | Fain et al. |
| 3,442,664 A | 5/1969 | Heine |
| 3,579,540 A | 5/1971 | Ohlhausen |
| 3,900,672 A | 8/1975 | Hammond et al. |
| 3,959,563 A | 5/1976 | Vaughn, Jr. et al. |
| 3,989,609 A | 11/1976 | Brack |
| T954,010 I4 | 1/1977 | Brunner et al. |
| 4,130,672 A | 12/1978 | Onoki et al. |
| 4,172,156 A | 10/1979 | Ritter et al. |
| 4,196,246 A | 4/1980 | Takayama et al. |
| 4,267,213 A | 5/1981 | Beck et al. |
| 4,273,826 A | 6/1981 | McCollister et al. |

(Continued)

FOREIGN PATENT DOCUMENTS

| | | |
|---|---|---|
| EP | 0924537 A1 | 6/1999 |
| EP | 1022587 A1 | 7/2000 |
| JP | 51-1387 | 1/1976 |
| JP | 52-26382 | 2/1977 |
| JP | 54-23557 | 2/1979 |
| JP | 56-86980 | 7/1981 |
| JP | 57-47330 | 3/1982 |
| JP | 58-172245 | 10/1983 |
| JP | 58-211701 | 12/1983 |
| JP | 59-13201 | 1/1984 |
| JP | 59-39714 | 3/1984 |

(Continued)

OTHER PUBLICATIONS

Belleville, P., et al., "A UV–cured sol–gel broadband anti-reflective and scratch–resistant coating for CRT," SPIE vol. 3943, Sol–Gel Optics V (2000), pp. 67–71.

Oliveira, P.W., et al., "General of wet–chemical AR–coatings on plastic substrates by use of polymerizable nanoparticles," SPIE vol. 3136, pp. 452–461.

Floch, H.G., et al., "Sol–gel broadband antireflective coating for advanced laser–glass amplifiers," SPIE vol. 2288, Sol–Gel Optics III (1994), pp. 14–24.

*Primary Examiner*—Deborah Jones
*Assistant Examiner*—G. Blackwell-Rudasill
(74) *Attorney, Agent, or Firm*—Blakely Sokoloff Taylor & Zafman LLP

(57) ABSTRACT

A radiation-curable anti-reflective coating is disclosed. The coating may be deposited on a substrate by spinning, dipping or rolling. The anti-reflective coating may have two layers in which case the anti-reflective coating has a V-shaped reflectance pattern in the visible wavelength spectrum. The anti-reflective coating may have three layers in which case the anti-reflective coating has a broadband reflectance pattern in the visible wavelength spectrum.

24 Claims, 2 Drawing Sheets

U.S. PATENT DOCUMENTS

| | | | |
|---|---|---|---|
| 4,286,024 A | | 8/1981 | Yoldas |
| 4,338,377 A | | 7/1982 | Beck et al. |
| 4,361,598 A | | 11/1982 | Yoldas |
| 4,410,563 A | | 10/1983 | Richter et al. |
| 4,476,156 A | | 10/1984 | Brinker et al. |
| 4,535,026 A | | 8/1985 | Yoldas et al. |
| 4,599,272 A | | 7/1986 | Ichikawa |
| 4,609,267 A | | 9/1986 | Deguchi et al. |
| 4,652,467 A | | 3/1987 | Brinker et al. |
| 4,710,227 A | | 12/1987 | Harley et al. |
| 4,731,264 A | | 3/1988 | Lin et al. |
| 4,765,729 A | * | 8/1988 | Taniguchi .................. 351/163 |
| 4,944,962 A | | 7/1990 | Furuta et al. |
| 4,966,812 A | | 10/1990 | Ashley et al. |
| 5,061,769 A | | 10/1991 | Aharoni |
| 5,172,812 A | | 12/1992 | Wharton et al. |
| 5,178,955 A | | 1/1993 | Aharoni et al. |
| 5,198,267 A | | 3/1993 | Aharoni et al. |
| 5,225,244 A | | 7/1993 | Aharoni et al. |
| 5,385,955 A | | 1/1995 | Tarshiani et al. |
| 5,476,717 A | | 12/1995 | Flock |
| 5,580,819 A | | 12/1996 | Li et al. |
| 5,622,784 A | | 4/1997 | Okaue et al. |
| 5,719,705 A | | 2/1998 | Machol |
| 5,770,306 A | | 6/1998 | Suzuki et al. |
| 5,858,526 A | | 1/1999 | Floch et al. |
| 6,165,564 A | | 12/2000 | Crast et al. |
| 6,228,433 B1 | | 5/2001 | Witt |
| 6,232,360 B1 | | 5/2001 | Meixner et al. |
| 6,241,505 B1 | | 6/2001 | Buazza et al. |
| 6,245,428 B1 | | 6/2001 | Port et al. |
| 6,277,485 B1 | * | 8/2001 | Invie et al. .................. 428/336 |

FOREIGN PATENT DOCUMENTS

| | | |
|---|---|---|
| JP | 59-231501 | 12/1984 |
| JP | 60-258190 | 12/1985 |
| JP | 61-130902 | 6/1986 |
| JP | 62-80603 | 4/1987 |
| JP | 62-148902 | 7/1987 |
| JP | 63-214791 | 9/1988 |
| JP | 63-228101 | 9/1988 |
| JP | 64-9222 | 1/1989 |
| JP | 64-86101 | 3/1989 |
| JP | 1-149808 | 6/1989 |
| JP | 1-239501 | 9/1989 |
| JP | 1-309003 | 12/1989 |
| JP | 2-671 | 1/1990 |
| JP | 2-2671 | 1/1990 |
| JP | 2-87101 | 3/1990 |
| JP | 2-130501 | 5/1990 |
| JP | 2-181701 | 7/1990 |
| JP | 2-197801 | 8/1990 |
| JP | 2-248480 | 10/1990 |
| JP | 3-148603 | 6/1991 |
| JP | 3-195757 | 8/1991 |
| JP | 3-266801 | 11/1991 |
| JP | 4-72055 | 3/1992 |
| WO | WO 00/27931 | 5/2000 |

* cited by examiner

RADIATION-CURABLE ANTI-REFLECTIVE COATING SYSTEM

BACKGROUND

1. Field of the Invention

The invention relates to coating compositions and more particularly to the radiation curable coating compositions.

2. Description of Related Art

Uncoated, optically transparent plastic and glass substrates such as ophthalmic lenses and cathode ray tube (CRT) screens reflect a portion of incident light. The amount of reflection varies with the wavelength, polarization, and angle of incidence of the light as well as the wavelength-dependent refractive index, n, of the material. Usually, the light loss reflected from the surfaces of uncoated substrates is on the order of about seven percent. Significantly more light loss occurs in transparent substrates having a high refractive index (e.g., refractive index on the order of 1.55 or higher).

One method for reducing light reflection from optically transparent substrates is to coat the surfaces of the substrates with anti-reflective coatings. As described in Optical Thin Films User's Handbook by James D. Rancourt, Macmillan Publishing Company, 1987, there are two common anti-reflective coating designs. One is the double layer structure of a first or bottom layer having a high refractive index and a second or top layer having a low refractive index with the corresponding thickness of quarter and quarter wavelength. The second anti-reflective coating design is the three layer structure of a first or bottom layer having a middle refractive index, a second or middle layer having a high refractive index, and a third or top layer having a low refractive index with the corresponding thickness of quarter, half, and quarter wavelength, respectively. The double layer anti-reflective coating has a V-shape pattern of reflectance in the visible wavelength spectrum, while the three layer anti-reflective reflective coating has a broadband pattern of reflectance in the visible wavelength spectrum. The materials used for such anti-reflective coatings include oxides, nitrides, and fluorides of silicon (Si), titanium (Ti), aluminum (Al), zirconium (Zr), ashmony (Sb), boyillium (Be), bismuth (Bi), cerium (Ce), magnesium (Mg), hafnium (Hf), lanthanum (La), prascodymium (Pr), tantalum (Ta), etc. Numerous anti-reflective coating systems have been disclosed in the U.S. Pat. No. 4,130,672; U.S. Pat. No. 4,172,156; and U.S. Pat. No. 5,172,812. The anti-reflective coatings in these documents are generally applied on transparent substrates primarily by a vacuum deposition processes, such as evaporation and sputtering. Although vacuum deposition techniques produce high quality anti-reflective coatings, they suffer from high cost limits in small optical laboratories.

Non-vacuum cost-effective coating processes, such as solution coating, have been developed to replace vacuum deposition processes. Solution coating processes are disclosed in the U.S. Pat. No. 4,361,598; U.S. Pat. No. 4,966,812; U.S. Pat. No. 5,476,717; U.S. Pat. No. 5,580,819; and U.S. Pat. No. 5,858,526. Such anti-reflective coatings made by a coating solution process generally must be cured for a certain amount of time at high temperature (e.g., up to 300° C. or even higher temperatures) to get enough hardness to be suitable. This high curing temperature and long curing process limits the application of the anti-reflective coatings only to glass substrates which are generally not deformed during thermal curing at high temperature. Plastic substrates, such as ophthalmic lenses, are easily deformed or burned at temperatures up to 300° C.

Radiation curing is used in the coating industry. Under high energy radiation such as ultraviolet (UV) light or electron beam radiation, the monomer-containing solution polymerizes to form a hard layer. UV-curable monomer-containing coating formulations typically contain a photo-initiator which starts the polymerization reaction of the monomers under UV light. Following radiation curing, the coatings become hard and have good chemical resistance. Compared with thermal curing processes, radiation curing processes have more economic advantages such as fast cure of a few seconds, less heat generation, and low energy consumption. Radiation-curable compositions for abrasion and scratch resistant coatings are disclosed in the U.S. Pat. No. 3,989,609; U.S. Pat. No. 6,165,564; U.S. Pat. No. 6,228,433; U.S. Pat. No. 6,232,360; and U.S. Pat. No. 6,241,505.

DETAILED DESCRIPTION

An apparatus comprising a substrate having a coating composition formed thereon is disclosed. In one embodiment, the coating composition comprises a plurality of layers at least one of which is a radiation-curable layer. The coating composition is suitable for coating transparent substrates such as glass and plastics, especially ophthalmic lenses. Such a coating composition may be selected to have a variety of different reflectance patterns in visible wavelengths. One reflectance pattern is a V-shape indicating a relatively narrow reflectance band and another pattern has broader reflectance pattern. Generally speaking, a V-shaped reflectance pattern describes a reflectance pattern that minimizes reflectance of light (e.g., visible light) at a particular wavelength or around a particular wavelength, for example, at or around 550 nanometers (nm). A broader reflectance pattern describes a reflectance pattern that minimizes reflectance of light among a range of wavelengths (e.g., 450 nm to 650 nm). It is appreciate that with the techniques described herein for forming anti-reflective coatings, the V-shape and the broadband shape are optimizable for particular wavelengths or ranges of wavelengths by, for example, modifying the refractive index and thickness of the deposited layers that make-up the coatings.

The V-shape anti-reflective coating composition described herein may be comprised of two layers: one having, relative to the other, a high refractive index and the other having a low refractive index. One arrangement of the layers is the high refractive index layer covered (coated) with the low refractive index layer. A broadband anti-reflective coating, in one embodiment, may be composed of three layers: one or a first layer, for example, closest to the transparent substrate having, relative to the other layers, a medium refractive index, the one above it, or a second layer having a higher refractive index, and the top or third one having a low refractive index.

Figure 1:
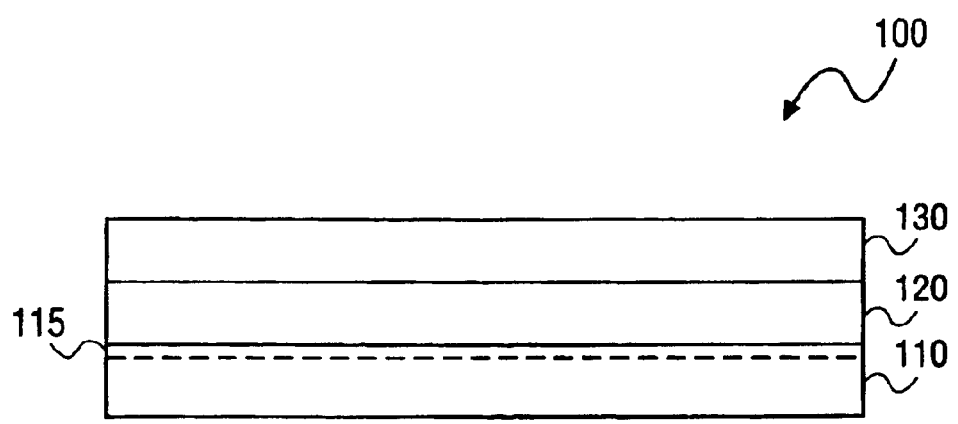
FIG. 1 is a schematic cross-sectional side view of an anti-reflective coating having a stack of at least two layers on a substrate.

FIG. 1 shows a schematic, cross-sectional view of an apparatus comprising a substrate having a coating composition formed thereon. The coating composition, in this embodiment, is formed of a plurality of deposited layers at least one of which comprises a radiation-curable (e.g., ultraviolet curable, electron-beam radiation curable, etc.) material. FIG. 1 shows apparatus 100 including a substrate with two deposited layers selected to have a V-shape (or single) reflectance pattern in the visible wavelength spectrum.

Referring to FIG. 1, in one embodiment, substrate 110 is an organic polymer (e.g., plastic), glass, ceramic, or metal material. In one embodiment, substrate 110 is a transparent material such as an organic polymer or glass. Optionally formed over a surface of substrate 110 (in FIG. 1, a superior surface) is hardcoat layer 115 of a material that may be known in the industry. One suitable material for hardcoat layer 115 is polysiloxane.

Overlying a surface of substrate 110 (e.g., a superior surface as shown) and optional hardcoat layer 115 is first deposited layer 120. First deposited layer 120, in one example, is selected to have a relatively high index of refraction (e.g., relative to a subsequent layer). In one embodiment, first deposited layer 120 is a colloid material of a metal compound, including, but not limited to, metal oxides, metal carbides, and metal nitrides combined/modified with a condensation product of an organosilane (e.g., tetramethoxysilane). Suitable metal oxides include, but are not limited to, aluminum oxide ($Al_2O_3$), titanium oxide (e.g., $TiO_2$), zinc oxide, and iron oxide. Suitable metal carbides include, but are not limited to, titanium carbide. Suitable metal nitrides include, but are not limited to, titanium nitride. The metal compounds are preferably crystalline powders made, for example, by vacuum processes or wet processes. Through, for example, a grinding process, the particles are selected to have a particle size suitable for forming a transparent layer or film. One particle size is less than one micron and on the order of one hundred to several hundred nanometers.

The concentration of the colloids are preferably controlled between 10 and 20 weight percent. The colloidal coating solutions that are used to form first deposited layer 120 are made by dispersing the metal compound particles (combined/modified with a condensation product of an organosilane) with a dispersing agent such as an amide-based dispersing agent, e.g., dimethylformamide, and subsequently, diluting the concentrated colloids to 1 to 5 weight percent with solvents. Suitable solvents are those that do not destroy the colloidal properties of the colloid, such as alcohols and water.

The refractive indices of the layers made of the colloids may be adjusted by varying the amount of organosilanes contained therein. The organosilanes used for modification of the metal oxides, nitrides, or carbides include, but are not limited to, organosilanes such as tetraalkoxysilane, trialkoxysilane or dialkoxysilane. Organosilanes tend to reduce the refractive index of the colloidal particles. In general, the greater the quantity of organosilanes in the surface of the colloidal particles, the lower refractive index of the layer. In one embodiment, first deposited layer 120 of a V-shape anti-reflective coating has a refractive index that varies, in one example, from 1.45 to 1.75 (e.g., relatively high refractive index).

In one example, first deposited layer 120 of, for example, a colloid is introduced by a spinning process. Spinning continues for about one minute to form a stable layer over a surface of substrate 110 having a thickness on the order of 50 to 150 nm (e.g., 90 nm).

Referring to FIG. 1, overlying first deposited layer 120 on substrate 110 is second deposited layer 130. In an embodiment where apparatus 100 of FIG. 1 is selected to have a V-shape reflectance band (and first layer 120 is selected to have a relatively high index of refraction (e.g., 1.45 to 1.75) over a transparent substrate), second deposited layer 130 is selected to have a relatively low refractive index, on the order of 1.30 to 1.50.

Selected material for second deposited layer 130 is a radiation-curable material. Acrylate monomers, preferably multi-functional (meth)acrylate monomers can be used as binders of the top layer. Any multifunctional (meth)acrylate can be used as long as the selected monomer does not create stability ("gelling") or viscosity problems of the corresponding coating solution. In order to make a hard anti-reflective coating, however, it is desired that second deposited layer 130 composition include at least one multifunctional (meth)acrylate monomer that has a functionality of at least three. Typical (meth)acrylates include, but are not limited to, propoxylated trimethylolpropane triacrylate (CD 501, SARTOMER), ethoxylated trimethyolpropane triacrylate (SR-502, SARTOMET), highly propoxylated (5.5) glyceryl triacrylate (CD9021, SARTOMER), ethoxylated trimethloprone triacrylate (SR-454HP, SARTOMER), dipentaerythritol pentaacrylate (SR 399, SARTOMER). Among the acrylates, dipentaerythritol pentaacrylate (SR 399), propoxylated trimethylolpropane triacrylate (CD 501), glyceryl triacrylate (CD9021) are preferred. These monomers may be used alone. However, to adjust the refractive index, hardness and adhesion of the layer, it is preferred to employ two or more monomers. In one embodiment, the composition of second deposited layer 130 contains one to ten weight percent of multifunctional (meth)acrylate monomers, preferably, three to six weight percent of the multifunctional (meth)acrylate monomers.

In one embodiment, the monomers polymerize without catalysis under electron beam irradiation. In another embodiment, a photoinitiator may be included into the top coating solution to initiate or catalyze the polymerization reaction of the monomers when they are placed under ultraviolet (UV) light radiation. In one embodiment, the top coating compositions contain on the order of about 10 percent by weight of a photoinitiator. In another embodiment the top coating composition contains preferably 0.5 to 5 percent by weight photoinitiator.

In one embodiment, suitable photoinitiators used include, but are not limited to, 2-butoxy-1,2 diphenylethanone, 2,2-dimethoxy-1,2-diphenylethanone and 2,4,6-trimethylbenzophenone, benzophenone, hydroxycyclohexyl phenylketone, acetophenone, acenaphthenequinone, o-methoxy benzophenone, thioxanthen-9-one, xanthen-9-one, 7H-Benz(de)anthracen-7-one, dibenzosuberone, 1-naphthaldehyde, 4,4'-bis(dimethylamino) benzophenone, fluorine-9-one, 1'-acetonaphthane anthraquinone, 1-indanone, 2-tertbutylanthraquinone, valerophenone, hexanophenone, 3-phenylbutyrophenone, p-morpholinopropiophenone, 4-morpholinobenzophenone, p-diacetyl-benzene, 4-amino-benzophenone, 4'methoxyacetophenone, benzaldehyde, 9-acetylphenanthrene, 2-acetylphenanthrone, 10-thioxanthenone, 3-acetylphenanthrene, 3-acetylindole, 1,3,5-triacetylbenzene and like, including blends thereof. In one embodiment, the photoinitiators, 2-butoxy-1,2 diphenylethanone, 2,2-dimethoxy-1,2-diphenylethanone, 2,4,6-trimethylbenzophenone, and benzophenone are preferable.

In another embodiment, other additives, such as fluoroalkyl-containing compounds, may be incorporated into the formulation of second deposited layer 130. It is believed that fluoroalkyl-containing compounds tend to decrease the refractive index of the top layer. Suitable fluoroalkyl-containing compounds are the polycondensed products of a mixture of alkoxysilanes. In one embodiment, the mixture may be, but is not limited to, tetraethoxysilane or tetramethoxysilane, and a trialkoxysilane or dialkoxysilane having a perfluoroalkyl group containing from 3 to 20 carbon atoms. The chemical structure of a trialkoxysilane is representatively given as follows:

$$C_xF_{2x+1}Si(OR)_3$$

wherein R represents, in one example, a lower C1–C4 alkoxy group selected from the group consisting of methoxy, ethoxy, isopropoxy and n-butoxy, and x varies from 3 to 20.

In one embodiment, the fluoroalkyl-containing silicon compounds are prepared in such a manner that the mixture of the tetraalkoxysilane and the trialkoxysilane or dialkoxysilane having a perfluoroalkyl group is hydrolyzed with water in a single or mixed alcoholic solvent, and then polycondensed. An acid, such as nitric acid, may be added into the mixture before hydrolysis to act as a catalyst. In one embodiment, the hydrolysis and polycondensation reaction may run at 30–50° C. for 10–20 hours. The polycondensed fluoroalkyl-containing silicon compound is then added into the second deposited layer 130 formulation, wherein the solid content of the fluoroalkyl-containing silicon compound may be at least 0.5 percent by weight. In another embodiment, the solid content of the fluoroalkyl-containing silicon compound may be 2 percent by weight.

A solvent may further be added into the formulation of second deposited layer 130. The solvent for the top coating composition may be a mixture of an alcohol solvent having a lower boiling point, such as C1–C4 alcohol (methanol and ethanol being preferred), a ketone such as methyl ethyl ketone and methyl propyl ketone, and a viscous solvent having higher boiling point, such as ethylene glycol monomethyl ether and ethylene glycol.

In one example, second deposited layer 130 is introduced by a spinning process. Spinning continues for about one minute to form a stable layer having a thickness on the order of 50 to 150 nm (e.g., 100 nm). Following deposition, the composite structure may be cured to harden the deposited layers, particularly second deposited layer 130. In one embodiment, the cure is accomplished by exposing apparatus 100 to a radiation source such as an UV or e-beam radiation source (dependent, to an extend on the material selected for second deposited layer 130).

In one embodiment, shown in FIG. 1, the composite structure (apparatus 100) has an anti-reflective property. The composite structure is formed of a substrate (e.g., substrate 110) of, for example, a transparent material. Overlying substrate 110 (and optional hard coat layer 115) is first deposited layer 120 and radiation-curable second deposited layer 130. In an embodiment where the composite structure has a V-shape reflectance pattern in the visible wavelength spectrum, first deposited layer 120 is selected to have a relatively high refractive index (relative to the individual layers) of, for example, 1.45 to 1.55. Overlying first deposited layer 120 is second deposited layer 130 of, for example, a radiation curable material having a relatively low refractive index on the order of 1.30 to 1.50.

Figure 2:
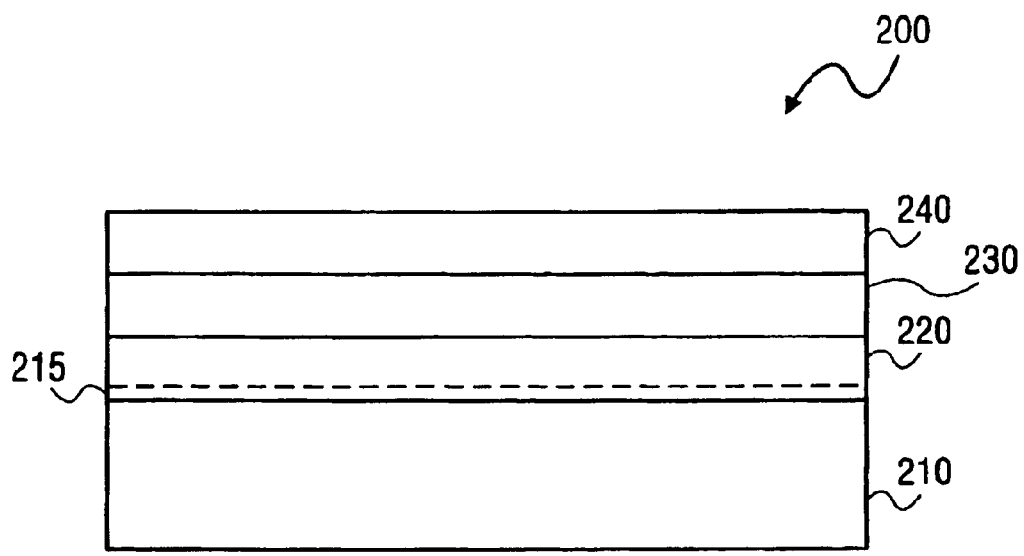
FIG. 2 is a schematic cross-sectional side view of an anti-reflective coating having a stack of at least three layers on a substrate.

FIG. 2 shows a schematic, cross-sectional view of an apparatus comprising a coating composition formed thereon. In this example, the coating composition is selected to have a broadband reflectance pattern in the visible wavelength spectrum.

Referring to FIG. 2, apparatus 200 includes substrate 210 of an organic polymer (e.g., plastic), glass, ceramic or metal materials. In one example, substrate 210 is a transparent material such as an organic polymer or glass.

Optionally formed over a surface of substrate 210 (in FIG. 2, a superior surface) is hardcoat layer 215 such a polysiloxane. Overlying optional hardcoat layer 215 is first deposited layer 220. In one embodiment, first deposited layer 220 is a colloid of a metal compound (e.g., metal oxide, metal nitride, metal carbide, etc.) combined/modified with an organosilane (e.g., tetraoxysilane). In this regard, the material of first deposited layer 220 is similar to the first deposited layer 120 of FIG. 1. In one embodiment, the refractive index of first deposited layer 220 is selected to be on the order of 1.45 to 1.55. The refractive index may be adjusted by varying the amount of organosilanes contained in the coating solution used to form first deposited layer 220. The concentration of the colloids in the coating solution are preferably controlled between 10 and 20 weight percent and the coating solution may be made by diluting the concentrated colloids with solvents on the order of one to five weight percent.

The coating solution used to form first deposited layer 220 may be introduced by a spinning process, continuing for about one minute, to form a layer having a thickness on the order of 50 to 150 nm.

Overlying first deposited layer in the structure (apparatus 200) of FIG. 2 is second deposited layer 230. In one embodiment, second deposited layer 230 is also formed from a colloid composition combined/modified with a condensation product of organosilanes. In the example of forming a composite coating (of three deposited layers and a broadband spectrum), second deposited layer 230 is selected to have a refractive index on the order of 1.50 to 1.75. Like first deposited layer 220, second deposited layer 230 may be formed from a coating solution introduced, in one example, by spinning (for about one minute) to a thickness on the order of 90 to 200 nm.

Overlying second deposited layer 230 in the structure (apparatus 200) shown in FIG. 2 is third deposited layer 240. In one example, third deposited layer 240 is selected to be a radiation-curable (e.g., e-beam or UV curable material) similar to second deposited layer 130 described with reference to FIG. 1 and the accompanying text. Multi-functional acrylate monomers (e.g., (meth)acrylate monomers), possibly two or more combined with a photoinitiator (e.g., in the case of UV curable monomers) and possibly containing additives, such as fluoro-alkyl-containing additives, are suitable. Third deposited layer 240 is selected, in an example of forming a composite coating (of three deposited layers), to have a refractive index on the order of 1.30 to 1.50. A coating solution may be introduced by spinning onto the surface of substrate 200 (e.g., the superior surface) to a thickness on the order of 50 to 150 nm.

Figure 3:
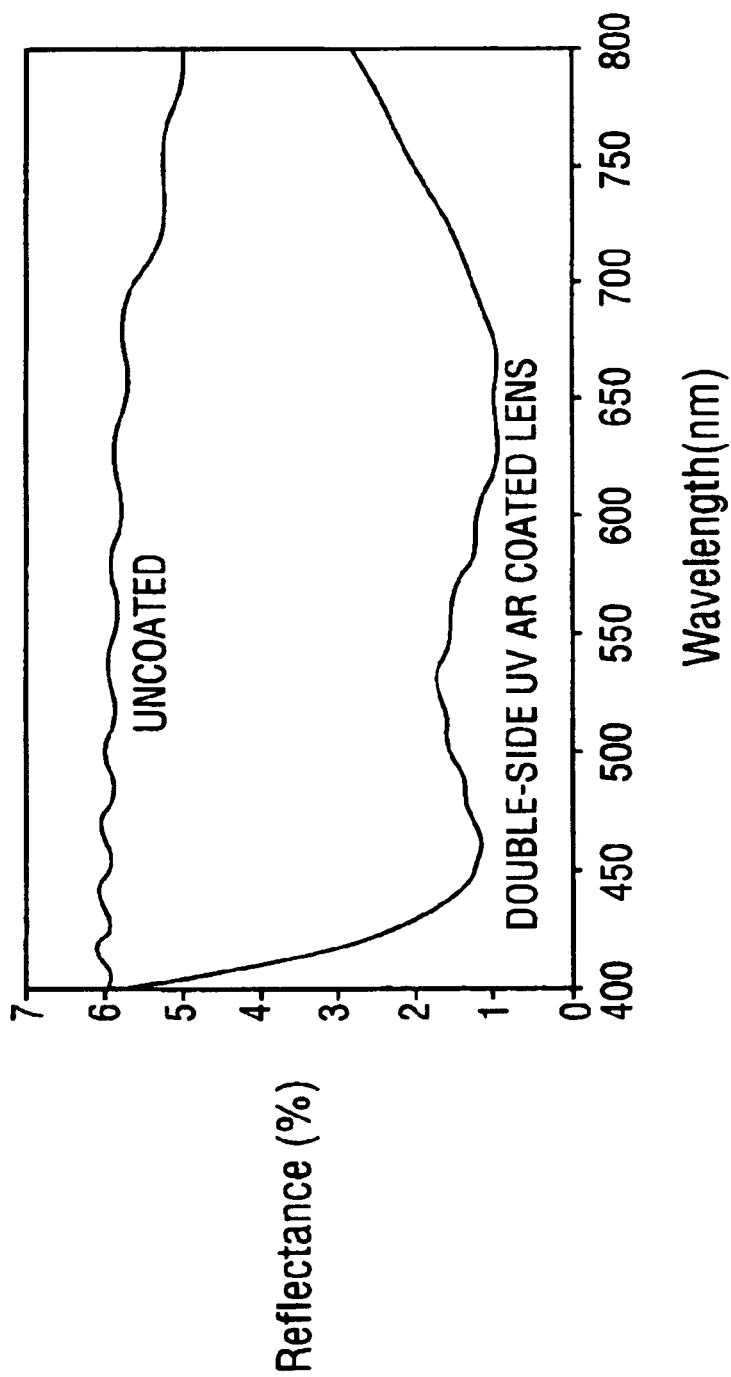
FIG. 3 is a diagram of the reflectance of the ophthalmic lens without an anti-reflective coating and with an ultraviolet (UV)-cured anti-reflective coating.

FIG. 3 shows a representative example of the reflectance of an ophthalmic lens without an anti-reflective coating and with a UV curable anti-reflective coating selected to have a broadband reflectance in the visible spectrum similar to the three layer coating described above with reference to FIG. 2 and the accompanying text.

In the above examples, the composite structures are described as including a plurality of layers on a substrate. It is appreciated that the individual layers thought possibly distinctly deposited, do not necessarily overlie one another with a distinct interface between each layer. Instead, particularly with spin operations, the plurality of layers may blend together to some extent.

The method described above to form a composite substrate is a relatively inexpensive, generally simpler method compared to prior techniques as it eliminates the need for expensive evaporators or plasma equipment. The formulating of the deposited layer materials do not require complex or expensive equipment. Simple film application techniques, including spinning, dipping, rolling, or spraying permit the coating of large complicated shapes, and even simultaneous coating of the inner and outer surfaces of a tube. The large scale application of a surface coating is possible without a limit on the size of the part to be coated. As noted above, there are many prior art anti-reflective surface coatings applied to vitreous substrates. However, the method described above and the materials selected eliminate the necessity to heat and/or etch the coating to produce an anti-reflecting film on a substrate.

The composite coating of the invention is particularly useful for coating various substrates such as glass, ceramics, metals, and organic polymeric materials to increase light transmission, without a need to subject the coating or the substrate to high temperature curing processes. Substrates coated with the coating of the invention may be used, for example, in ophthalmic lenses, display filters and solar photovoltaic applications.

Having been generally described, the following example describes a particular embodiment, to illustrate some of the properties and demonstrate the practical advantages thereof, and to allow one skilled in the art to utilize the invention. It is understood that these examples are to be construed as merely illustrative.

EXAMPLE1

In one embodiment, the antireflection coating may be fabricated as follows.

1) The Preparation of Coating Composition of the First Layer with Medium Refractive Index.

350 grams of tetraethoxysilane (TEOS) was dropped into water based 20 weight percent $TiO_2$ colloid during stirring. The mixture was then stirred at 70° C. for 5 hours. The mixture was dried at 150° C. for 6 hours to get $SiO_2$-modified $TiO_2$ powder. The powder was crystallized at 700° C. for 2 hours. The powder was then dispersed into colloid by grinding. The solid content of the $SiO_2$ modified $TiO_2$ colloid was controlled from 10 to 20 weight percent. The colloid was diluted into 1 to 5 weight percent with the solvent mixture of methanol, ethanol, methyl ethyl ketone, and ethylene glycol.

2) The Preparation of the Coating Composition of the Second Layer with High Refractive Index.

The preparation of coating composition of the first layer was repeated except that less amount of tetraehoxysilane was added into the $TiO_2$ colloid. 120 gram of tetraethoxysilane (TEOS) was dropped into 3370 gram of $TiO_2$, colloid.

3) Preparation of the UV-curable Coating Composition of the Top Layer with Low Refractive Index.

The polycondensed fluorine-containing silicon compounds are prepared as follows:

25 grams of (tridecafluoro-1,1,2,2-tetrahydrooctyl) triethoxysilane was mixed with 100 grams of tetraethoxysilane (TEOS) and 90 grams of $HNO_3$ aqueous solution (containing 1 gram $HNO_3$). The mixture was left in a closed glass container at 50° C. for 12 hours and then cooled slowly to room temperature. The product was named as FCSC and kept in a refrigerate prior to use. The following ingredients were added in the sequence listed to a plastic container and were mixed gently for 20 minutes.

| | |
|---|---|
| FCSC | 5 grams |
| Methanol | 10 grams |
| ethylene glycol monomethyl ether | 40 grams |
| Dipentaerythritol pentaacrylate (SR-399, Sartomer) | 3.5 grams |
| Highly propoxylated glyceryl triacrylate (SR-9021, Sartomer) | 2.5 grams |
| Finally other two ingredients were added into the mixture: | |
| 2,4,6-trimethylbenzophenone | 0.5 grams |
| Ethylene glycol monomethyl ether | 20 grams |

The resulting product was mixed to form a transparent UV-curable composition for the top layer.

4) Application and Curing of an Anti-reflective Coating on an Ophthalmic Lens.

The coating solution for first layer was injected on the front side of the polycarbonate ophthalmic lens during spinning the lens with the speed of 500 to 1500 RPM and then the coated lens was spun more for 1 minute to stabilize the first layer. Without interruption the coating solution for second layer was injected on the surface of the first layer during spinning the lens with the speed of 500 to 1500 RPM and then the coated lens was spun more for 1 minute to stabilize the second layer. Finally the coating solution for top layer was injected on the surface of the second layer during spinning the lens with the speed of 500 to 1500 RPM and then the coated lens was spun more for 1 minute to stabilize the top layer. The coated lens was cured for 30 seconds with the UV (ultraviolet) light of a medium pressure mercury. The coating process for the front side of the lens was repeated to apply coatings on the backside of the lens. FIG. 2 shows the reflectance pattern of the ophthalmic lens with the invented UV (ultraviolet)-cured anti-reflective coating. The reflectance of the coated lens was broad and less than 2 percent in the visible wavelength.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
   a substrate; and
   a coating composition on a surface of the substrate comprising a plurality of deposited layers,
   at least one of the plurality of deposited layers comprising a colloid of plurality of dispersed crystalline metal particles and a condensation product of an organosilane; and
   at least one of the plurality of layers comprises a radiation curable material.

2. The apparatus of claim 1, wherein the plurality of deposited layers comprises at least two layers and, relative to one another, a first layer has a high refractive index and a second layer has a low refractive index.

3. The apparatus of claim 2, wherein the second layer is formed on the first layer and the first layer has a thickness on the order of 50 to 150 nanometers and comprises a refractive index on the order of 1.45 to 1.75.

4. The apparatus of claim 2, wherein the second layer is formed on the first layer and the first layer comprises the crystalline metal compound.

5. The apparatus of claim 2, wherein the second layer is formed on the first layer and the second layer has a thickness on the order of 50 to 150 nanometers and comprises a refractive index of the top layer is 1.30 to 1.50.

6. The apparatus of claim 5, wherein the second layer comprises a silicon compound.

7. The apparatus of claim 5, wherein the second layer comprises a radiation-curable material.

8. The apparatus of claim 7, wherein the second layer comprises one of an ultraviolet and an electron beam-curable material.

9. The apparatus of claim 6, wherein the second layer comprises at least one multi-functional monomer.

10. The apparatus of claim 9, wherein the multi-functional monomer comprises an acrylate monomer having an acrylic functionality of three or greater.

11. The apparatus of claim 9, wherein the second layer further comprises a condensation product of an alkoxysilane having a fluoroalkyl group.

12. The apparatus of claim 1, wherein the coating composition comprises three layers, wherein, relative to one another, a first layer comprises a medium refractive index, a second layer comprises a high refractive index, and a third layer comprises a low refractive index.

13. The apparatus of claim 12, wherein the three layers are stacked one over the other, first layer to third layer, and the thickness of the first layer is about 50 to 150 nanometers and the refractive index of the first layer is about 1.45 to 1.55.

14. The apparatus of claim 13, wherein the first layer comprises a crystalline metal compound.

15. The apparatus of claim 13, wherein the thickness of the second layer is about 50 to 200 nanometers and the refractive index of the second layer is about 1.45 to 1.75.

16. The apparatus of claim 15, wherein the second layer comprises the crystalline metal compound.

17. The apparatus of claim 13, wherein the thickness of the third layer is 50 to 150 nanometers and the refractive index of the third layer is 1.30 to 1.50.

18. The apparatus of claim 17, wherein the third layer comprises the radiation-curable layer, and wherein the third layer includes at least one acrylate monomer.

19. The apparatus of claim 18, wherein the third layer comprises at least one (meth)acrylate monomer and a silicon compound.

20. The apparatus of claim 19, wherein the third layer has a property selected to be one of ultraviolet and electron beam-curable.

21. The apparatus of claim 17, wherein the third layer comprises:
at least one (meth)acrylate functional monomers having an acrylic functionality of three or greater;
an initiator; and
a polycondensed silicon compound of the mixture of tetraalkoxysilane and a trialkoxysilane or dialkoxysilane having a fluoroalkyl group.

22. An apparatus comprising:
a substrate including a transparent material;
an anti-reflective coating composition on a surface of the substrate, the coating composition comprising a plurality of deposited layers;
a first deposited layer of the plurality over the substrate, the first layer comprising a colloid including dispersed particles of a crystalline metal compound and a condensation product of an organosilane; and
a second deposited layer of the plurality over the first layer, the second layer having a different refractive index, wherein of the first deposited layer and the second deposited layer than a refractive index of the first layer and the second deposited layer comprises a radiation-curable layer.

23. The apparatus of claim 22, wherein the radiation-curable material comprises polymerized acrylate monomers having acrylic functionalities of three or greater.

24. The apparatus of claim 22, wherein the second deposited layer comprises a condensation product of an alkoxysilane having a fluoroalkyl group.

* * * * *

UNITED STATES PATENT AND TRADEMARK OFFICE
CERTIFICATE OF CORRECTION

| | | |
|---|---|---|
| PATENT NO. | : 6,942,924 B2 | Page 1 of 1 |
| APPLICATION NO. | : 10/001639 | |
| DATED | : September 13, 2005 | |
| INVENTOR(S) | : He et al. | |

It is certified that error appears in the above-identified patent and that said Letters Patent is hereby corrected as shown below:

Column 8:
In Claim #1, line 6, insert -- a -- after the first "of".
i.e. ...a colloid of a plurality of...

Signed and Sealed this

Twenty-seventh Day of November, 2007

JON W. DUDAS
*Director of the United States Patent and Trademark Office*